April 14, 1936.  A. E. SHIRLOW ET AL  2,037,601
BIOGRAPH FILM WINDING APPARATUS
Original Filed Feb. 14, 1933  2 Sheets-Sheet 1
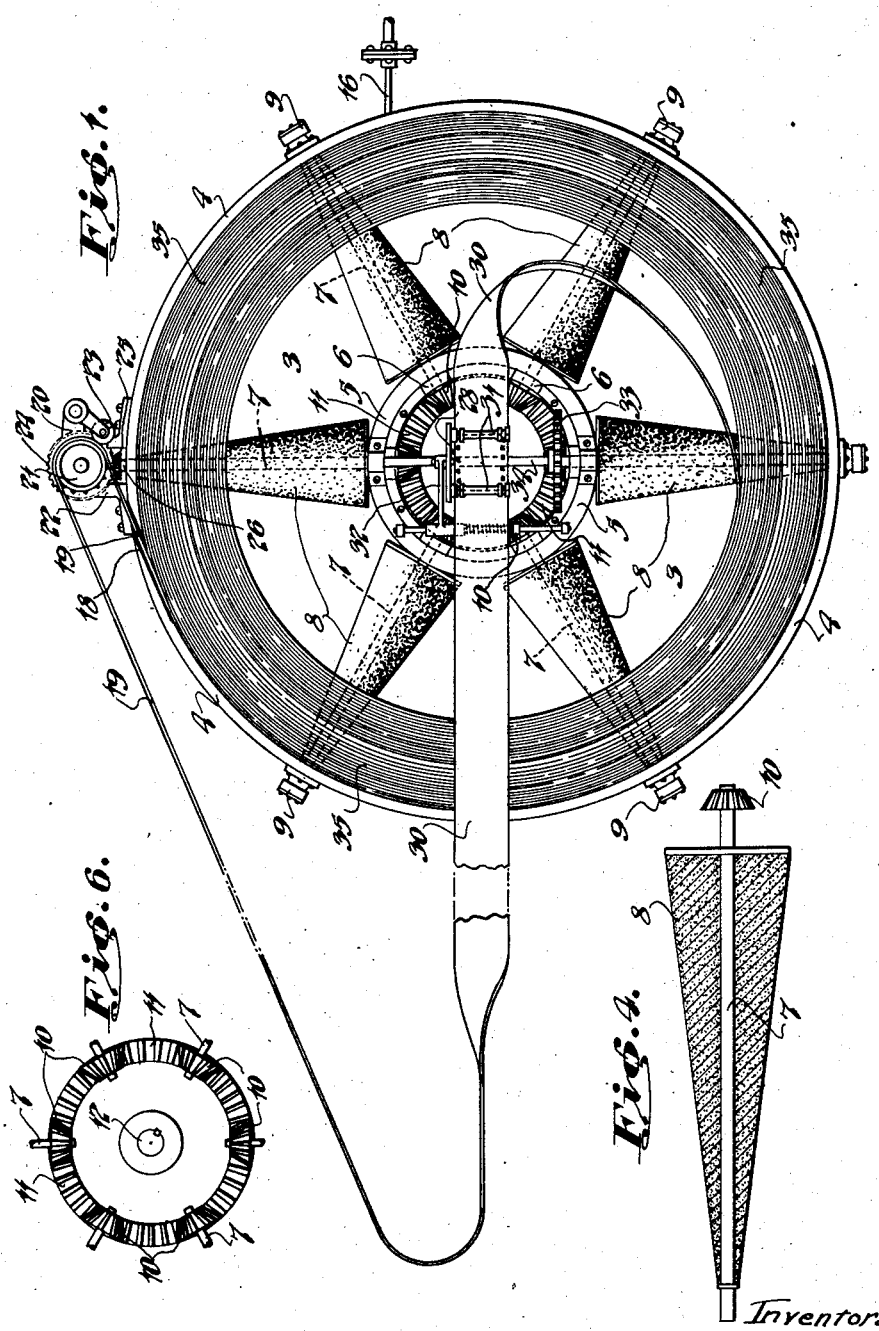
Inventors:-
Albert Edward Shirlow
and Thomas Bartlett McDiarmid
by E. F. Wenderoth
Atty.

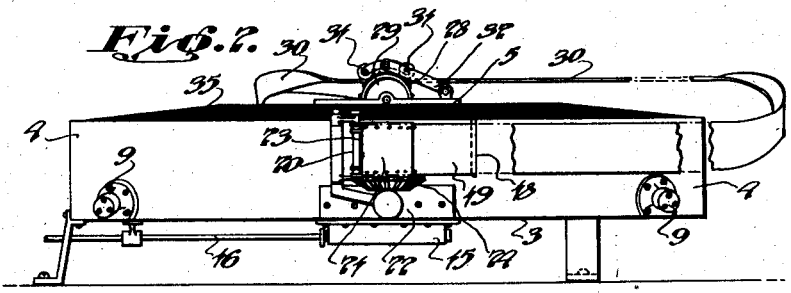

Patented Apr. 14, 1936

2,037,601

UNITED STATES PATENT OFFICE 2,037,601

BIOGRAPH FILM WINDING APPARATUS

Albert Edward Shirlow, Caulfield, near Melbourne, Victoria, and Thomas Bartlett McDiarmid, Melbourne, Victoria, Australia Application February 14, 1933, Serial No. 656,750. Renewed September 13, 1935. In Australia March 3, 1932

7 Claims. (Cl. 88—18.7)

This invention has reference to biograph film winding apparatus and has been devised to provide mechanism whereby the title of a film is always in advance of the story being told upon the screen, thereby preventing the necessity of rewinding the film in order to prepare it for a further screening as is necessary at the present time.

It will be appreciated that double wear is given the film during the operations between one screening and the next, which double wear reduces the normal useful life of the film by half, whereas with apparatus constructed and operating according to our invention only one winding is necessary.

The invention is particularly advantageous in continuous film displays such as are arranged in shows which have a predetermined program comprising a number of subjects and shown throughout day and night and in a selected order, such order remaining constant at all sessions and in such a case the selected films may, if desired, be joined together in the well-known manner, while the starting end of the first film will be joined to the finishing end of the said film, thereby obtaining positive continuity.

The apparatus to be described will be found equally advantageous in connection with films which are not endless for the reason that when the film has been run through the machine, the normal starting end is in the same position as before it was run through.

The object of this invention is to provide mechanism or apparatus for winding films during or after projection in such a manner that the film is returned on the flat to the inside of the film roll, which is positioned on a plurality of radially arranged and inclined rotating elements, the constant speed of which causes the film to turn on its edge and gravitate down said elements, whereby the film convolutions move relatively to each other and are packed together on said elements on edge, whereby the outer layer of film is always in a position to pass out of the apparatus to form a film loop ready for projection.

The invention is characterized in that the film winding apparatus is provided with a plurality of radial and conical elements such as resilient rollers, all of which are driven at the same speed, the spindles of said rollers being preferably inclined towards the centre of the film roll, whereby said rollers assume an inclined position within the apparatus.

As essential feature embodied in the invention consists in disposing the conical rollers with the maximum diameter of the cone towards the centre of a flanged disc, thus the minor diameter of the said rollers becomes adjacent the periphery of the said disc or the outer layer of film when in the apparatus.

A further essential feature resides in that the radially arranged and inclined conical rollers cause the film convolutions to move relative to one another in such a manner that they are packed, one against the other, as they are fed back into the mechanism to be described.

A further essential feature comprises the means of driving the rollers synchronously at the same speed to effect the winding of the film as hereinafter described.

In order that the invention may be more readily understood, reference will now be made to the accompanying drawings in which:—

Figure 1 is a view in plan of the film winder constructed in accordance with our invention, and Figure 2 is a side elevation thereof.

Figure 3 is a central section of the film winder.

Figure 4 is a detail view of one of the rollers.

Figure 5 is a detail view of the driving mechanism for actuating the feed-in mechanism.

Figure 6 is a view of an essential detail.

According to this invention, and as illustrated in Figures 1, 2 and 3, the apparatus for winding biograph or like films comprises a flanged disc 3 having a peripheral flange 4, the internal diameter of the flange depending upon the length of film to be accommodated.

The centre of the flanged disc is formed with an upraised annular ring 5, the circumference of which is provided with a plurality of spaced bearings 6 adapted to support the inner ends of the spindles 7 of a series of radially arranged and conical rollers 8, and the spindles 7 are inclined towards the centre of the said disc 3 with the highest point thereof adjacent to the supporting annular ring 5.

By inclining the spindles 7 of the rollers 8, same are positioned on the same inclined plane, while the outer ends of the spindles 7 are housed in anti-friction bearings 9 fitted to the annular flange 4 of the supporting disc 3.

The conical rollers 8 are preferably surfaced with a resilient or yielding material such as rubber, or they may be constructed wholly of such material.

The conical rollers 8 are radially arranged as illustrated in Figures 1 and 3 within the flanged disc 3 with the major diameter of the rollers at the inner and upper end thereof whereby the minor diameter of the said rollers is adjacent to the inside of the flange 4 of the supporting disc 3, this end of the said rollers being the lowest point and the inclination thereof is such that the lower end of the rollers 8 extends to a position near the base of the flange 4 of the supporting disc 3, sufficient clearance being maintained to permit the free rotation of said rollers.

It is a feature of the invention that the rollers 8 are driven synchronously at the same speed and preferably by means of disposing a bevel gear 10 on the upper and inner end of each spindle 7 of the conical rollers 8, said bevel gears 10 meshing with a crown wheel 11 supported in the central annular ring 5 of the disc 3.

The vertical spindle 12 of the crown wheel 11 is supported in a bearing 13 within the annular ring 5 and at its lower end is fitted with a worm wheel 14 enclosed in a casing 15 fitted to the underside of the base of the flanged disc 3, said worm wheel being in engagement with a worm driven from a prime mover, or in lieu thereof, any suitable means may be provided to drive the spindle 16 of the worm in conjunction with the biograph machine.

As is clearly illustrated in Figure 3, the worm drive actuates the crown wheel 11 which simultaneously drives all the bevel pinions 10 at the same time, and at the same speed as the bevel pinions 10 are of equivalent diameter.

Formed in the annular flange 4 of the supporting disc 3 is an angular slot 18 through which the outer layer of the film 19 passes to the gate of the projector (not shown) and adjacent to said slot and supported by the annular flange 4 of the disc 3 is a sprocket gate 20 adapted to guide and pass the film 19 outwardly from the flanged disc 3.

The sprocket gate 20 comprises the usual sprocket 21 and frame 22 with pressure rollers 23 acting in conjunction therewith, and disposed on the spindle of said sprocket 21 is a bevel gear 24 to mesh with a bevel pinion 25 mounted on the outer end 26 of the inclined spindle 7 of the adjacent conical roller 8. The film sprocket 21 is therefore driven in unison with the conical rollers 8.

Disposed above the inner annular ring 5 of the flanged disc 3 is a further sprocket gate 28 to guide and deliver the returned portion 30 of the film 19 into the apparatus, said gate comprising a film sprocket 29 having a set of upper pressure rollers 31 mounted on an arm 32 supported above the upper surface of the annular ring 5.

The film sprocket 28 is driven by means of a pinion 33 mounted on its spindle 34, said pinion being in mesh with one of the bevel gears 10 driving the adjacent conical roller 8, which ensures that the said sprocket 28 is driven in unison with the said rollers and at a constant speed in relation thereto, and as the output film sprocket 21 is also geared to the rollers, it will be appreciated that the speed of the film during winding is maintained constant by virtue of the fact that all the rotary mechanisms are geared together.

The film of any type (that is, endless or otherwise) is removed from the spool at present employed and placed upon the conical rollers with the edge of the film convolutions engaging with the upper inclined surface of each roller 8.

The outer layer of the film, that is, the one seating against the inside of the outer annular flange 4 of the supporting disc 3, is extended through the slot 18 in said flange and passed over and through the sprocket gate 20 and extended in a loop as illustrated in Figure 1 to provide for the extension of the film through the gate of the biograph machine for projection, the return of said loop from the projector gate extending across the flange 4 of the flanged disc 3 at the horizontal centre to pass through the sprocket gate 28 which feeds the said loop into the flanged disc 3 to be wound as will now be described.

With the film roll 35 in position on the conical rollers 8 as illustrated in Figure 1 during or after projection, the film may be wound in order to commence at the start of a program by means of setting in motion the gearing described through the medium of a prime mover or in conjunction with the biograph machine.

As previously described, the worm drive actuates the crown wheel 11 through the worm wheel 14 which in turn drives the bevel gears 10 to cause the inclined conical rollers 8 to rotate at a constant and uniform speed, while the output sprocket gate 20 and the feed-in sprocket gate 28 are also driven in unison with said rollers 8 through the medium of the gearing described.

As the returned portion 30 of the film 19 passes through the feed-in sprocket gate 28, it is brought into contact with the adjacent rotating roller and is turned on edge as illustrated in Figure 1, and as the said roller is rotating and the surface thereof is inclined, the film is shaped into a convolution to gravitate towards the flange 4 of the supporting disc 3 which thereby causes the film to be packed or wound against the inside of the film roll 35.

The inclination and rotation of the conical rollers 8 causes the film convolutions in each instance to take the correct position relative to one another and move in sequence on the said rollers to be packed or wound around the inside of the film roll 35 and such arrangement maintains the film in close contact to obviate buckling and possible injury.

By driving each conical roller 8 at the same speed and causing each layer of film to contact therewith on edge, the film layer is shaped in the manner of a convolution and friction between the film layers is reduced to a minimum, accordingly, during projection the outer layer of the film is passed outwardly through the adjacent sprocket gate 20 to the projector and then returned on the flat through the feed-in gate 28 to be turned on edge by the rotation of the conical rollers 8 and the inclination thereof ensures that each incoming or return portion of the film is shaped into a convolution and packed or wound around the inside of the film roll positioned on the conical rollers 8, the movement and winding of the film being maintained in a continuous cycle.

By the film winding apparatus described, the winding of the film spool between each showing is entirely eliminated and by returning the exhibited or projected portion of the film to the inside of the film roll, the title of the film is always in advance of the story, whereby the film may be projected continuously in positive continuity.

Although one practical form of carrying the invention into practical effect has been described and illustrated, it will be obvious that improvements and modifications may be embodied in the invention such as with the gearing described without departing from the spirit and scope of the invention.

What we claim as our invention and desire to secure by Letters Patent is:—

1. An apparatus for winding films comprising a flanged disk, a plurality of radially arranged and inclined conical rollers supported by said disk and adapted to have positioned thereon a film roll, the flange of said disk having a slot therein through which the outer layer of said film passes and means for returning said film with the flat surface thereof disposed in a plane at right angles to the axis of the film roll to the center of said film roll and said film being thereafter turned on edge by said rollers to be packed against the inside of the film roll in a continuous cycle.

2. An apparatus for winding films comprising a flanged disk, a plurality of radially arranged and inclined conical rollers supported within said disk, said disk having a slot in the flange thereof through which the outer layer of a film roll resting upon said rollers may pass, means for guiding the outer layer of said film away from said disk, means for driving said rollers synchronously at the same speed and means for guiding the return portion of the film directly above said rollers so as to engage with said rollers to have the film turn on edge so that it may be packed around the inside of the film roll.

3. An apparatus for winding films comprising a flanged disk, a plurality of radially arranged and inclined conical rollers supported by said disk adapted to receive a film roll, the flange of said disk having a slot therein through which the outer layer of the film roll may pass, a sprocket adapted to receive said film as it leaves said slot and form a loop thereof for projecting purposes, means for driving said sprocket in unison with and at the same speed as said rollers, a second sprocket for receiving the return portion of said loop and leading it in a plane at right angles to the axis of the film roll to the center of the said film roll so as to contact said conical rollers whereby the film is turned on edge and packed against the inside of the film roll.

4. An apparatus for winding films comprising a disk having outer and inner concentric flanges, a plurality of conical rollers inclined upwardly towards the center of said flanged disk and said rollers having their bearings disposed in said outer and inner flanges.

5. In apparatus for winding biograph or like films, a casing in the form of a flanged disk, a plurality of diametrically arranged rubber covered rollers supported within said casing to receive a film roll, said rollers being conical and inclined outwardly with the base of the cones at the center of the disk, diametrically arranged spindles extending upwardly through the conical rollers, a bevel gear on the upper end of each spindle to mesh with a crown wheel, means to actuate said crown wheel from a prime mover, a peripheral slot in the flange of said disk, means adjacent to said slot to guide the outer layer of the film roll in its passage from the flanged disk to form a loop for projection and means to guide the return portion of the film loop over and back onto the said rollers to the center of the film roll to be wound or packed continuously against the inside thereof by the rotation of the rollers.

6. In apparatus for winding biograph or like films, a casing in the form of a flanged disk, a plurality of inclined rubber covered conical rollers, said rollers being diametrically arranged and inclined downwardly and outwardly towards the periphery of the disk to carry a film roll on edge, means to rotate said rollers at a constant speed, a peripheral slot in the flange of the disk, a sprocket mounted adjacent to said slot to guide the outer layer of the film away from the said disk to form a film loop for projection, and a sprocket mounted above the center of the disk to direct the return portion of the loop back into said rollers on edge to be packed against the inside of the film roll.

7. In apparatus for winding biograph or like films, according to claim 6 and wherein the conical rollers and sprockets are driven in unison at the same speed for the purposes specified.

ALBERT EDWARD SHIRLOW.
THOMAS BARTLETT McDIARMID.